UNITED STATES PATENT OFFICE.

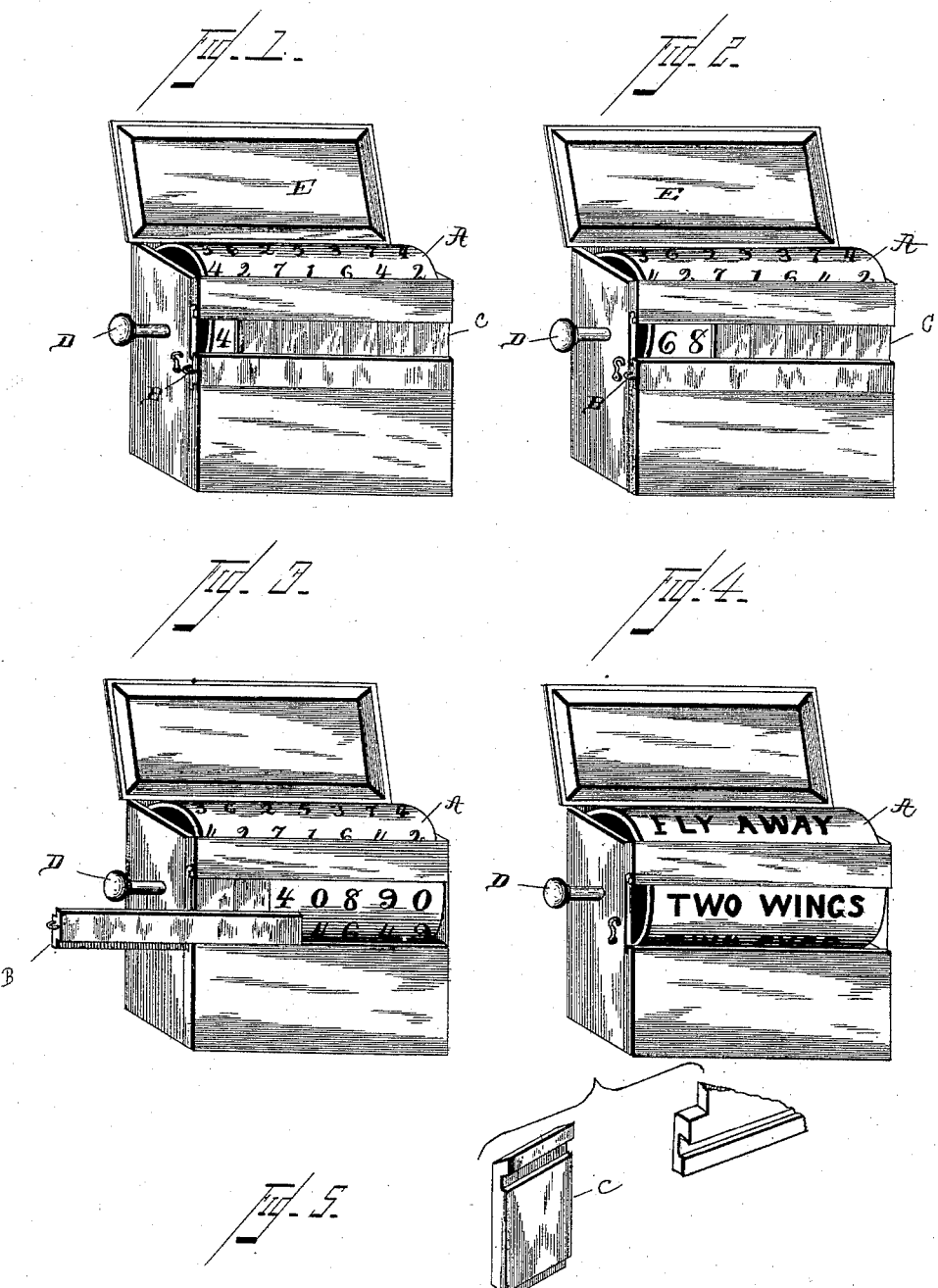

JAMES J. DOFFLEMYER AND CHARLES H. WOLFE, OF KEOKUK, IOWA.

EDUCATIONAL DEVICE.

SPECIFICATION forming part of Letters Patent No. 445,759, dated February 3, 1891.

Application filed January 15, 1890. Serial No. 337,007. (No model.)

*To all whom it may concern:*

Be it known that we, JAMES J. DOFFLEMYER and CHARLES H. WOLFE, citizens of the United States, residing at Keokuk, in the county of Lee and State of Iowa, have invented new and useful Improvements in Educational Devices; and we do hereby declare the following to be a full, clear, and exact description of said invention, reference being had to the accompanying drawings, and to the letters of reference marked thereon, which form a part of this specification.

Our invention relates to devices for educational purposes, and is intended to be used in the schoolroom.

The objects which it aims to secure are, first, to facilitate rapid practice in reading and in arithmetical operations; second, to place only the thing to be learned or performed before the eye of the learner; third, to secure accuracy and rapidity in arithmetical processes; fourth, to save the time of the teacher and pupil by diminishing the blackboard-work of the teacher and the copying of work by the pupils; fifth, to prevent the formation of bad habits on the part of the learner in arithmetical operations; sixth, to secure and cultivate in the learner the faculties of attention and correct and rapid perception and conception of the work placed before his view.

Our invention consists of a revolving cylinder covered with slated cloth or paper or any other suitable blackboard-surface placed in a box or stand behind adjustable openings, the cylinder being so arranged as to revolve freely before the openings and the openings so contrived and arranged as to be readily changed or adjusted by the operator. The cylinder can thus be written or printed upon with chalk or crayon, and also written, printed, or stamped sheets may be fastened upon it by means of elastic bands or other means.

The construction and manner of using or operating our invention by which these objects are attained are shown in the accompanying drawings, in which—

Figures 1, 2, 3, and 4 show four views in perspective of the invention as arranged for different purposes or uses. Fig. 5 shows in perspective one of the adjustable blocks and a portion of the box in which the groove is formed for holding the blocks mentioned in the specification.

Similar letters refer to similar parts in all the views.

The cylinder A is covered with a blackboard-surface and provided with a knob D for turning the same. This cylinder is placed in a box behind the sliding blocks *c c* and the removable strip B. When the lid E is closed, only as much of the cylinder is shown as can be seen by a displacement of the sliding blocks *c c* or the removable strip B.

Fig. 1 shows the blackboard and box as arranged for use in a column addition. The numbers are written upon the slated surface of the cylinder or else written, stamped, or printed upon sheets of paper fastened upon it. One of the sliding blocks *c c* being removed, but one of the figures on the cylinder can be seen at a time, a new figure being shown every time the cylinder is partly turned. The learner adds the digits brought to view as the cylinder is slowly revolved by the teacher. Sufficient practice having been had on one column, another of the sliding blocks *c c* is moved so as to cover the first column and reveal a new column to be used as before. By this use of our invention an instantaneous result is required and obtained from the child, and he is prevented from counting on his fingers or counting in any manner to secure the required result, and as the figures in view are constantly changing the learner is obliged to give close and unremitting attention.

Fig. 2 shows the invention as arranged for practice in the addition, subtraction, and multiplication tables. Two of the sliding blocks *c c* are removed and the two figures on the cylinder seen at once are added, subtracted, or multiplied, as the teacher directs, new figures being shown as the cylinder A is turned. By sliding the blocks *c c* through the groove *c'* new columns are shown for further practice. By removing more or any desired number of the sliding blocks *c c* any desired number of figures may be shown and used for drill in rapid reading of numbers or the rapid naming of the sum of any number of digits seen at one time.

Fig. 3 shows the invention as arranged for practice in subtraction of larger numbers.

More of the sliding blocks c c are removed and the removable strip B adjusted as may be desired, showing two numbers, one under the other. Every time the cylinder is turned a new problem is shown, to which the learner writes the answer. For work in multiplication or division the box is similarly arranged, the sliding blocks c c and the removable strips B being so adjusted as to make the multiplicand and multiplier or the dividend and divisor of any desired number of places. In this and in all arithmetical work the pupil is required to write answers or results only.

Fig. 4 shows the blackboard and box as arranged for drill in reading. All the sliding blocks c c and the removable strip B seen in the other figures are removed. The words to be read or spelled are written upon the cylinder or else written, printed, or stamped upon sheets fastened upon it. These are read or spelled by the learner as the cylinder is turned. The learner thus sees but one word, phrase, or sentence at a time and concentrates all his attention upon it. The object of this drill is to obtain rapid perception and recognition of the words or sentences shown.

Fig. 5 shows a larger perspective of one of the sliding blocks and a portion of the box in which the groove is formed aforementioned. It is so shaped and fitted into a groove in the box or stand as to remain suspended in its place after the removable strip B shown in the other figures is removed.

We do not consider the closed box shown in the drawings an essential part of our invention. Instead of it a screen or stand or any other arrangement which supports and conceals the revolving cylinder from in front and which is provided with the adjustable openings, as shown, can be used.

Having now described our invention, what we claim, and desire to secure by Letters Patent, is—

In a device for educational purposes, the combination of a box, a moving surface on which the objects to be learned are written or printed, a series of sliding blocks adapted to be moved through the opening, and a removable strip also adapted to be moved through the opening, substantially as set forth.

In testimony whereof we affix our signatures in the presence of two subscribing witnesses.

JAMES J. DOFFLEMYER.
CHAS. H. WOLFE.

Witnesses:
W. W. JAMIESON,
W. E. JAMES.